(12) United States Patent
Ohshima et al.

(10) Patent No.: US 9,414,182 B2
(45) Date of Patent: Aug. 9, 2016

(54) MOBILE STATION, BASE STATION, COMMUNICATION SYSTEM, DISPLAY CONTROL METHOD, COMMUNICATION CONTROL METHOD, AND PROGRAM

(75) Inventors: Akira Ohshima, Osaka (JP); Katsutoshi Ishikura, Osaka (JP); Toshiaki Kameno, Osaka (JP); Yoshio Konno, Osaka (JP); Yuichi Nobusawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 142 days.

(21) Appl. No.: 14/130,736

(22) PCT Filed: Sep. 14, 2012

(86) PCT No.: PCT/JP2012/073605
§ 371 (c)(1),
(2), (4) Date: Jan. 3, 2014

(87) PCT Pub. No.: WO2013/047235
PCT Pub. Date: Apr. 4, 2013

(65) Prior Publication Data
US 2014/0146737 A1    May 29, 2014

(30) Foreign Application Priority Data

Sep. 26, 2011   (JP) .................... 2011-208985

(51) Int. Cl.
*H04W 4/00*   (2009.01)
*H04W 4/06*   (2009.01)
(Continued)

(52) U.S. Cl.
CPC ............. *H04W 4/006* (2013.01); *H04W 4/06* (2013.01); *H04W 56/00* (2013.01); *H04W 12/02* (2013.01); *H04W 12/04* (2013.01)

(58) Field of Classification Search
None
See application file for complete search history.

(56) References Cited

U.S. PATENT DOCUMENTS

2004/0014482 A1 *   1/2004   Kwak et al. .................. 455/522
2005/0129018 A1     6/2005   Casaccia et al.
(Continued)

FOREIGN PATENT DOCUMENTS

EP   2 365 705 A1    9/2011
JP   9-261154 A      10/1997
(Continued)

OTHER PUBLICATIONS

3GPP TR 36.814 V9.0.0, "3rd Generation Partnership Project; Technical Specification Group Radio Access Network; Evolved Universal Terrestrial Radio Access (E-UTRA); Further Advancements for E-UTRA Physical Layer Aspects", Mar. 2010, Release 9, pp. 1-107.
(Continued)

*Primary Examiner* — Benjamin H Elliot, IV
(74) *Attorney, Agent, or Firm* — Birch, Stewart, Kolasch & Birch, LLP

(57) ABSTRACT

A mobile station is provided to which multimedia broadcast/multicast service can be applied also during carrier aggregation. A mobile station communicates with a base station by carrier aggregation using a plurality of component carriers having different frequency bands. The mobile station receives contents in MBMS from the base station using at least two component carriers of a plurality of component carriers. The mobile station causes a display to display the received contents.

7 Claims, 8 Drawing Sheets

(51) Int. Cl.
*H04W 56/00* (2009.01)
*H04W 12/02* (2009.01)
*H04W 12/04* (2009.01)

(56) References Cited

U.S. PATENT DOCUMENTS

| | | | |
|---|---|---|---|
| 2007/0189289 A1* | 8/2007 | Frederiksen | H04L 5/023 |
| 2008/0032698 A1 | 2/2008 | Gerstenberger et al. | |
| 2009/0196165 A1 | 8/2009 | Morimoto et al. | |
| 2010/0232340 A1 | 9/2010 | Godor et al. | |
| 2010/0310025 A1 | 12/2010 | Morimoto et al. | |
| 2011/0053490 A1* | 3/2011 | Wu | 455/3.01 |
| 2011/0170496 A1* | 7/2011 | Fong | H04L 5/0053 370/329 |
| 2011/0216686 A1* | 9/2011 | Wu | 370/312 |
| 2011/0222457 A1* | 9/2011 | Lee | H04W 28/06 370/312 |
| 2011/0222477 A1* | 9/2011 | Wu | 370/328 |
| 2011/0235565 A1* | 9/2011 | Wu | 370/312 |
| 2012/0039229 A1* | 2/2012 | Etemad | H04W 4/06 370/312 |
| 2013/0301509 A1* | 11/2013 | Purnadi et al. | 370/312 |
| 2014/0146737 A1* | 5/2014 | Ohshima et al. | 370/312 |

FOREIGN PATENT DOCUMENTS

| | | |
|---|---|---|
| JP | 2005-524333 A | 8/2005 |
| JP | 2007-508783 A | 4/2007 |
| JP | 2007-529122 A | 10/2007 |
| JP | 2007-300503 A | 11/2007 |
| JP | 2011-501610 A | 1/2011 |
| JP | 2011-188495 A | 9/2011 |

OTHER PUBLICATIONS

HTC, "MBMS in Carrier Aggregation", 3GPP TSG-RAN WG2 #69bis, R2-102357, Apr. 12-16, 2010, Beijing, China, pp. 1-2.

ZTE, Potevio, "Consideration on MBMS Deployments in CA", 3GPP TSG-RAN WG2 Meeting #74, R2-112898, May 9-13, 2011, Barcelona, Spain, pp. 1-2.

* cited by examiner

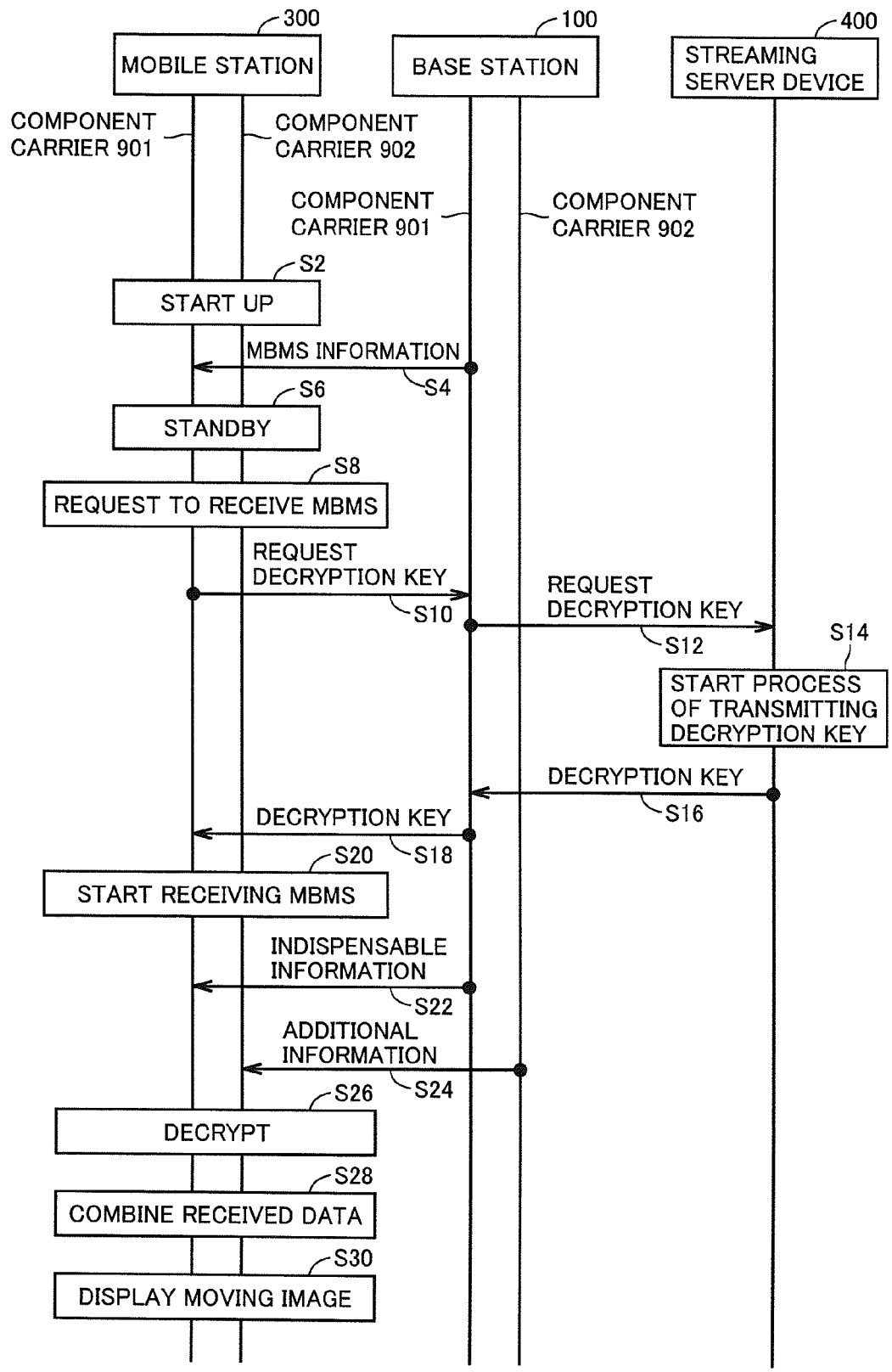

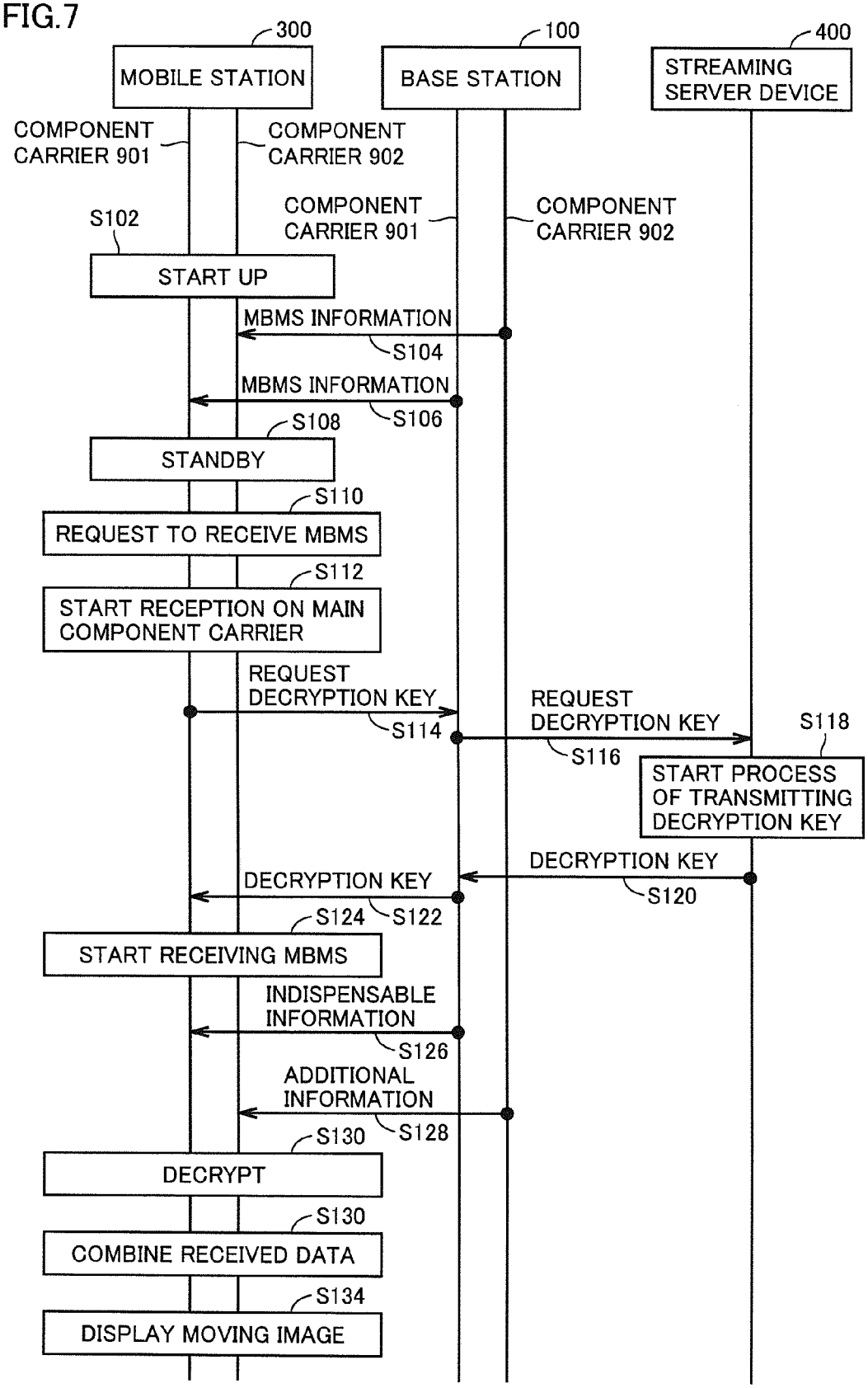

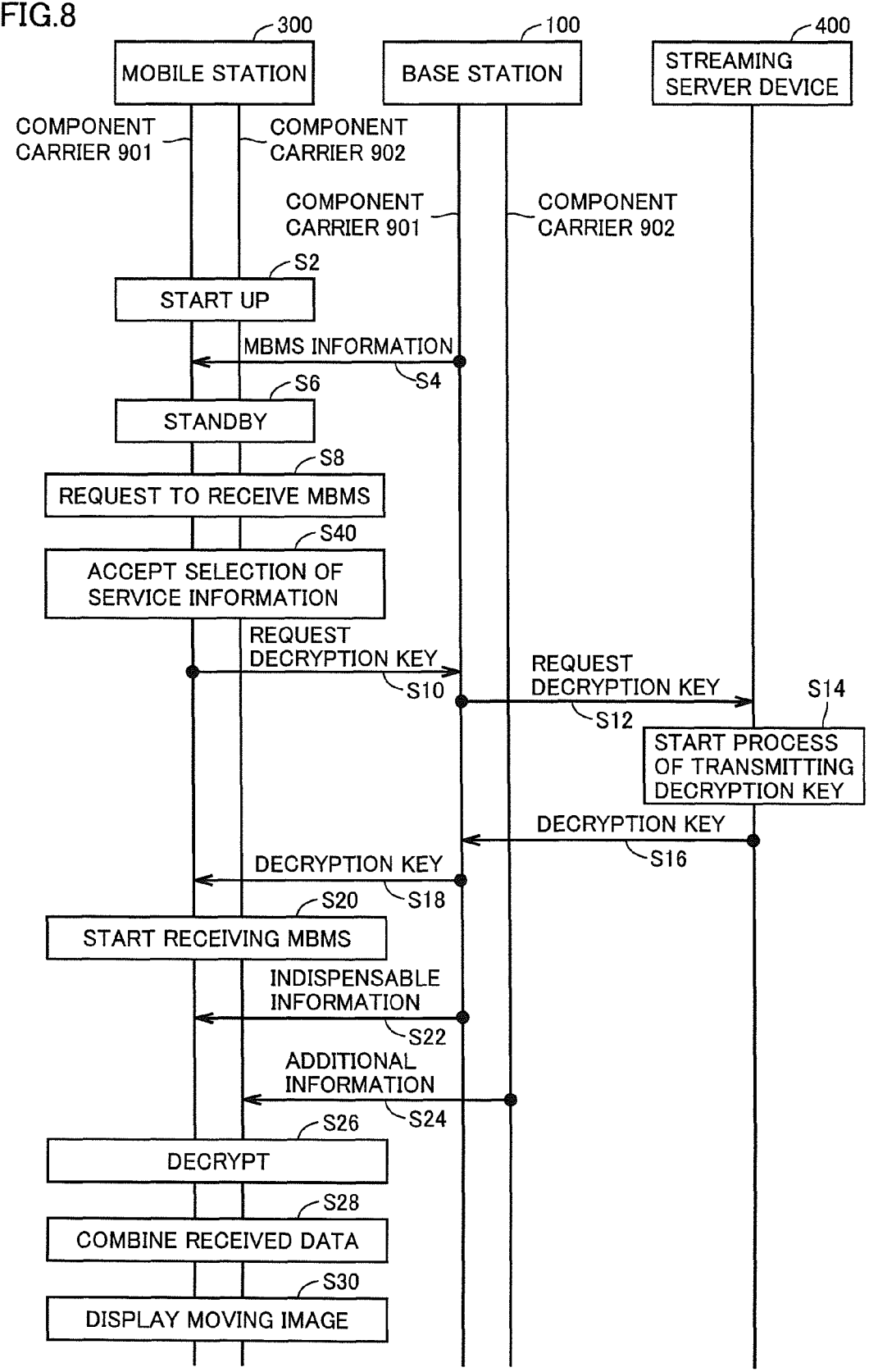

MOBILE STATION, BASE STATION, COMMUNICATION SYSTEM, DISPLAY CONTROL METHOD, COMMUNICATION CONTROL METHOD, AND PROGRAM

TECHNICAL FIELD

The present invention relates to a mobile station, a base station, a communication system, a display control method, a communication control method, and a program, and particularly to a mobile station and a base station performing carrier aggregation, a communication system including the mobile station and the base station, a display control method applied in the mobile station, a communication control method applied in the base station, a program for controlling the mobile station, and a program for controlling the base station.

BACKGROUND ART

According to 3GPP (The 3rd Generation Partnership Project), Multimedia Broadcast/Multicast Service (MBMS) using a mobile packet network is standardized for a LTE (Long Term Evolution) communication scheme.

According to MBMS, it becomes possible to use at least one of a Unicast/MBMS Mixed Cell utilizing a frequency band that is used also in service other than MBMS, and a MBMS Dedicated Cell utilizing a frequency band exclusively for MBMS.

In the case of the Unicast/MBMS Mixed Cell, as disclosed in Japanese Patent Laying-Open No. 2007-300503 (PTD 1), a subframe for MBMS (Multicast CH (MCH) subframe) and a subframe for unicast are subjected to time-division multiplexing (TDM), thereby transmitting MBMS.

Furthermore, according to 3GPP, the specifications of Long Term Evolution-Advanced (LTE-A) is being under study. In LTE-A, it is required to implement higher-speed communication than LTE. Accordingly, in LTE-A, it is required to support a band wider than that in LTE (a band up to 100 MHz exceeding the 20-MHz band in LTE). It is however difficult to ensure a globally-continuous wide-band frequency domain for LTE-A.

Therefore, a career aggregation (CA) technique is under study for LTE-A for the purpose of maintaining the compatibility with LTE as much as possible. The carrier aggregation technique is for establishing communication collectively on a plurality of frequency bands each having a bandwidth referred to as a component carrier (CC) up to 20 MHz, thereby ensuring the bandwidth up to 100 MHz, so as to implement high-speed and large-capacity communication. Non-Patent Document 1 set forth below discloses carrier aggregation described above.

CITATION LIST

Patent Document

PTD 1: Japanese Patent Laying-Open No. 2007-300503

Non Patent Document

NPD 1: 3GPP TR 36.814 V9.0.0 (2010-03), Technical Report, 3rd Generation Partnership Project; Technical Specification Group Radio Access Network; Evolved Universal Terrestrial Radio Access (E-UTRA); Further advancements for E-UTRA physical layer aspects (Release 9)

SUMMARY OF INVENTION

Technical Problem

The mobile station appropriate for the LTE-A scheme can establish high-speed and large-capacity data communication with a base station by using the carrier aggregation technique for unicast communication. However, no study has been made as to applying the carrier aggregation technique to MBMS.

The present invention has been made in light of the above-described problems, and an object of the present invention is to provide a mobile station, a base station, a communication system, a display control method, a communication control method, and a program to which MBMS can be applied also during carrier aggregation.

Solution to Problem

According to an aspect of the present invention, a mobile station communicates with a base station by carrier aggregation using a plurality of component carriers having different frequency bands. The mobile station includes reception means for receiving contents in a multimedia broadcast/multicast service from the base station using at least two component carriers of the plurality of component carriers; and display control means for causing a display to display the contents received.

Preferably, the contents include first information and second information associated with the first information. The reception means includes first reception means for receiving the first information using a first component carrier of the plurality of component carriers, and second reception means for receiving the second information using a second component carrier of the plurality of component carriers. The display control means causes the display to display the contents using the first information and the second information.

Preferably, the second component carrier synchronizes with the first component carrier. The first reception means further receives a synchronization signal from the base station on the first component carrier. The mobile station synchronizes with the first component carrier and the second component carrier based on the synchronization signal.

Preferably, the first reception means further receives a plurality of pieces of identification information for identifying the contents in a plurality of multimedia broadcast/multicast services. Based on acceptance of a command to select one of the plurality of pieces of identification information, the mobile station requests the base station to transmit the contents corresponding to the identification information selected.

Preferably, the first reception means further receives a first synchronization signal from the base station on the first component carrier. The second reception means further receives a second synchronization signal from the base station on the second component carrier. The mobile station synchronizes with the first component carrier based on the first synchronization signal, and synchronizes with the second component carrier based on the second synchronization signal.

Preferably, the contents are encrypted. The mobile station further includes transmission means for transmitting a request signal requesting transmission of the contents to the base station, and decryption means for decrypting the contents. The first reception means further receives a decryption key transmitted from the base station based on transmission of the request signal. The decryption means decrypts the contents using the decryption key.

Preferably, the decryption key includes a first decryption key for decrypting the first information, and a second decryption key for decrypting the second information. The first reception means receives the first decryption key using the first component carrier. The second reception means receives the second decryption key using the second component carrier. The decryption means decrypts the first information using the first decryption key, and decrypts the second information using the second decryption key.

Preferably, the second reception means receives the second information using the second component carrier and at least one component carrier of the plurality of component carriers other than the first component carrier and the second component carrier.

According to another aspect of the present invention, a base station communicates with a mobile station by carrier aggregation using a plurality of component carriers having different frequency bands. The base station includes reception means for receiving a request from the mobile station to receive contents in a multimedia broadcast/multicast service, and transmission means for transmitting the contents to the mobile station using at least two component carriers of the plurality of component carriers.

Preferably, the contents include first information and second information associated with the first information. The transmission means includes first transmission means for transmitting the first information using a first component carrier of the plurality of component carriers, and second transmission means for transmitting the second information using a second component carrier of the plurality of component carriers.

According to still another aspect of the present invention, a communication system includes a base station and a mobile station communicating with each other by carrier aggregation using a plurality of component carriers having different frequency bands. The base station transmits contents in a multimedia broadcast/multicast service to the mobile station using at least two component carriers of the plurality of component carriers. The mobile station receives the contents using at least two component carriers, and causes a display to display the contents received.

According to still another aspect of the present invention, a display control method is applied in a mobile station communicating with a base station by carrier aggregation using a plurality of component carriers having different frequency bands. The display control method includes the steps of: the mobile station receiving contents in a multimedia broadcast/multicast service from the base station using at least two component carriers of the plurality of component carriers; and the mobile station causing a display to display the contents received.

According to still another aspect of the present invention, a communication control method is applied in a base station communicating with a mobile station by carrier aggregation using a plurality of component carriers having different frequency bands. The communication control method includes the steps of: the base station receiving a request from the mobile station to receive contents in a multimedia broadcast/multicast service; and the base station transmitting the contents to the mobile station using at least two component carriers of the plurality of component carriers.

According to still another aspect of the present invention, a program is for controlling a mobile station communicating with a base station by carrier aggregation using a plurality of component carriers having different frequency bands. The program causes the mobile station to perform the steps of: receiving contents in a multimedia broadcast/multicast service from the base station using at least two component carriers of the plurality of component carriers; and causing a display to display the contents received.

According to still another aspect of the present invention, a program is for controlling a base station communicating with a mobile station by carrier aggregation using a plurality of component carriers having different frequency bands. The program causes the base station to perform the steps of: receiving a request from the mobile station to receive contents in a multimedia broadcast/multicast service; and transmitting the contents to the mobile station using at least two component carriers of the plurality of component carriers.

Advantageous Effects of Invention

According to the present invention, MBMS can be applied also during carrier aggregation.

BRIEF DESCRIPTION OF DRAWINGS

FIG. 6 is a sequence chart in the communication system.

FIG. 7 is another sequence chart in the communication system.

FIG. 8 is still another sequence chart in the communication system.

DESCRIPTION OF EMBODIMENTS

Figure 1:
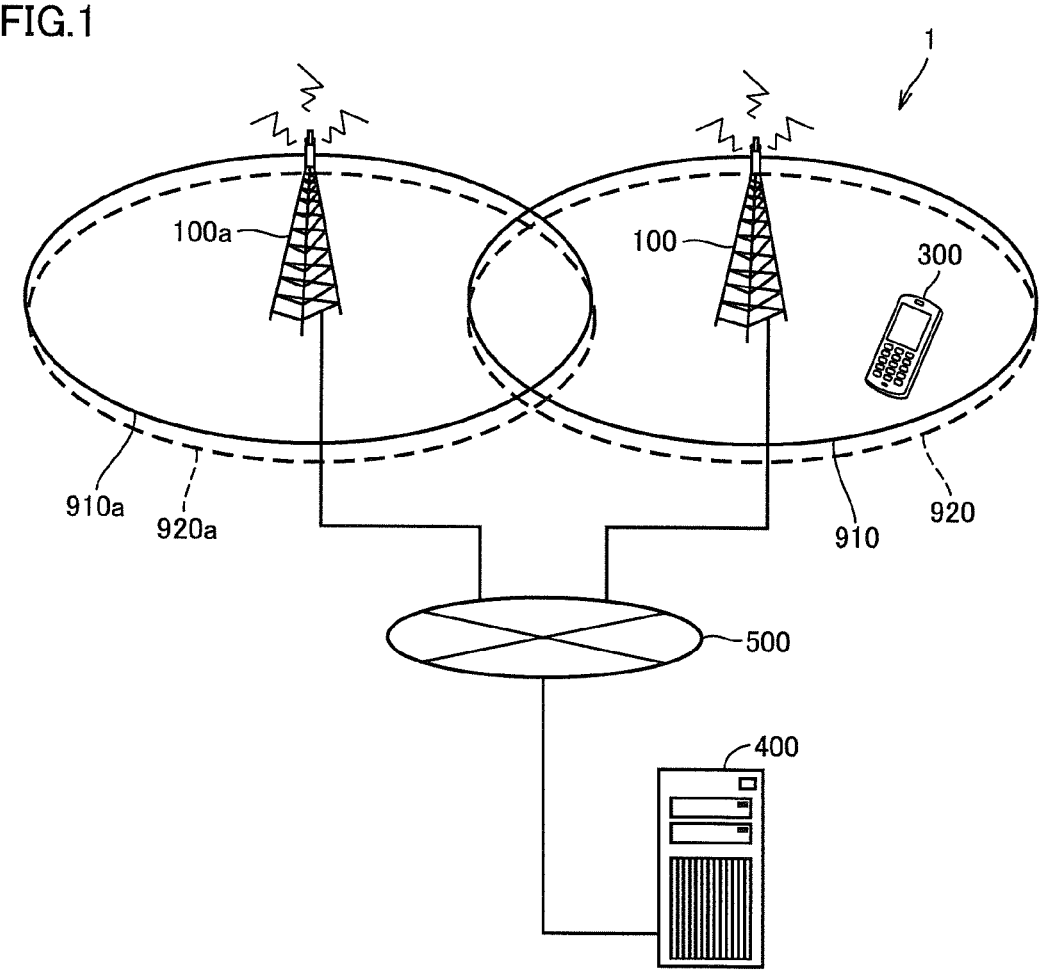
FIG. 1 is a schematic configuration diagram of a communication system.

Electronic devices according to each embodiment of the present invention will be hereinafter described with reference to the accompanying drawings. In the following description, the same components are designated by the same reference characters. Names and functions thereof are also the same. Accordingly, the detailed description thereof will not be repeated.

[First Embodiment]

<A. System Configuration>

FIG. 1 is a schematic configuration diagram of a communication system 1 according to the present embodiment. Referring to FIG. 1, communication system 1 includes a plurality of base stations 100 and 100a, a mobile station 300, and a streaming server device 400. FIG. 1 shows two base stations 100 and 100a as part of a plurality of base stations. For convenience of explanation, only one mobile station 300 is shown as a mobile station.

Base station 100 and base station 100a are connected through network 500. Furthermore, base stations 100 and 100a each are connected to streaming server device 400 through network 500 so as to allow communication therebetween.

Each of base stations 100 and 100a has a plurality of downlink (DL) component carriers. Each of base stations 100 and 100a forms a cell for each component carrier. In the following, description will be made by way of example with regard to the case where each of base stations 100 and 100a has two component carriers, for convenience of explanation.

Base station 100 forms a cell 910 indicated by a solid line by the first component carrier. Base station 100 also forms a cell 920 indicated by a dotted line by the second component carrier. On the other hand, base station 100a forms a cell 910a indicated by a solid line by the first component carrier. Base station 100a also forms a cell 920a indicated by a dotted line by the second component carrier. These four cells 910, 920, 910a, and 920a form a unicast/MBMS mixed cell. It is to be noted that "MBMS" indicates Multimedia Broadcast/Multicast Service, as mentioned above.

Streaming server device 400 distributes data for MBMS to base stations 100 and 100a.

Mobile station 300 is located under coverage of cells 910 and 920 formed by base station 100. In other words, mobile station 300 is located under coverage of the unicast/MBMS mixed cell. Mobile station 300 can utilize MBMS such as sound and an image.

<B. Hardware Configuration of Base Station>

Figure 2:
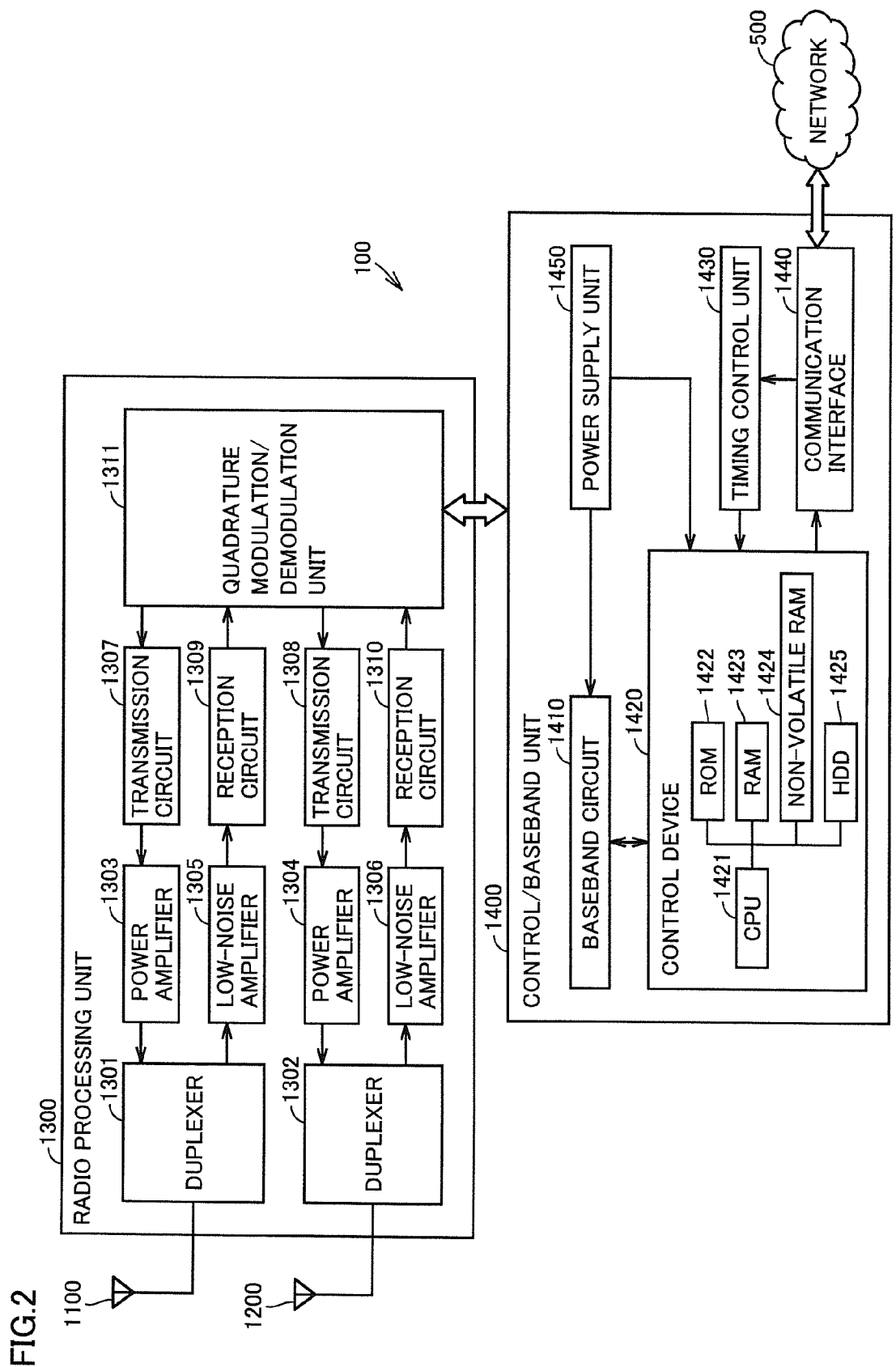
FIG. 2 is a diagram showing a typical hardware configuration of a base station.

FIG. 2 is a diagram showing a typical hardware configuration of base station 100. Referring to FIG. 2, base station 100 includes an antenna 1100, an antenna 1200, a radio processing unit 1300, and a control/baseband unit 1400.

Radio processing unit 1300 includes duplexers 1301 and 1302, power amplifiers 1303 and 1304, low-noise amplifiers 1305 and 1306, transmission circuits 1307 and 1308, reception circuits 1309 and 1310, and a quadrature modulation/demodulation unit 1311. Control/baseband unit 1400 includes a baseband circuit 1410, a control device 1420, a power supply unit 1450, a timing control unit 1430, and a communication interface 1440. Control device 1420 includes a CPU 1421, a ROM 1422, a RAM 1423, a non-volatile memory 1424, and an HDD (Hard Disk Drive) 1425.

The reason why radio processing unit 1300 includes two duplexers 1301 and 1302, two power amplifiers 1303 and 1304, two low-noise amplifiers 1305 and 1306, two transmission circuits 1307 and 1308, two reception circuits 1309 and 1310 is because carrier aggregation using two component carriers is performed by base station 100.

Quadrature modulation/demodulation unit 1311 quadrature-modulates/demodulates an OFDM (Orthogonal Frequency Division Multiplexing) signal processed in baseband circuit 1410, and converts the signal into an analog signal (RF (Radio Frequency) signal). Transmission circuits 1307 and 1308 each convert the RF signal generated by quadrature modulation/demodulation unit 1311 into a frequency that is to be transmitted as a radio wave. Reception circuits 1309 and 1310 each convert the received radio wave into a frequency that is to be processed in quadrature modulation/demodulation unit 1311.

Power amplifiers 1303 and 1304 amplify the power of the RF signals generated in transmission circuits 1307 and 1308 so as to be transmitted from antennas 1100 and 1200, respectively. Low-noise amplifiers 1305 and 1306 amplify the weak radio waves received by antennas 1100 and 1200, respectively, and send the waves to reception circuits 1309 and 1310, respectively.

Control device 1420 controls entire base station 100, executes a call control protocol, and monitors control. Timing control unit 1430 generates various clocks used in base station 100 based on a reference clock extracted from a transmission path or a GPS (Global Positioning System).

Communication interface 1440 serves as an interface for connecting base station 100 to a network.

Baseband circuit 1410 converts (modulates/demodulates) a packet transmitted and received using communication interface 1440 and an OFDM signal (baseband signal) carried on radio waves. Furthermore, the baseband signal is transmitted to and received from radio processing units 1300. Power supply unit 1450 converts the voltage supplied to base station 100 into a voltage used in base station 100.

The process in base station 100 is implemented by software executed by each hardware and CPU 1421. Such software may be stored in HDD 1425 and the like in advance. Furthermore, software may be stored in a memory card (not shown) or other storage media, and distributed as a program product. Alternatively, software may be provided as a downloadable program product by the information provider connected to the so-called Internet. Such software is read by an IC card reader/writer and other readers from its storage medium, or downloaded via a communication interface 1440, and then, temporarily stored in HDD 1425. This software is read from HDD 1425 by CPU 1421, and stored in non-volatile memory 1424 in the form of an executable program. CPU 1421 executes this program.

Each component constituting base station 100 shown in the figure is commonly used. Therefore, the essential part of the present invention can be recognized as software stored in HDD 1425, non-volatile memory 1424, a memory card and other storage media, or as software downloadable via a network. Since the operation of each hardware in base station 100 is well known, detailed description thereof will not be repeated.

A recording medium is not limited to a DVD-ROM, a CD-ROM, an FD (Flexible Disk), and a hard disk, but may be a medium fixedly carrying a program, such as a semiconductor memory including a magnetic tape, a cassette tape, an optical disk (MO (Magnetic Optical Disc)/MD (Mini Disc)/DVD (Digital Versatile Disc)), an optical card, a mask ROM, an EPROM (Electronically Programmable Read-Only Memory), an EEPROM (Electronically Erasable Programmable Read-Only Memory), a flash ROM, or the like. Furthermore, the recording medium is a non-transitory computer-readable medium.

The program referred herein includes not only a program directly executable by a CPU but also a program in a source program form, a compressed program, an encrypted program, and the like.

Since base station 100a also has a hardware configuration similar to that of base station 100, description of the hardware configuration of base station 100a will not be repeated.

<C. Transmission of Data>

Figure 3:
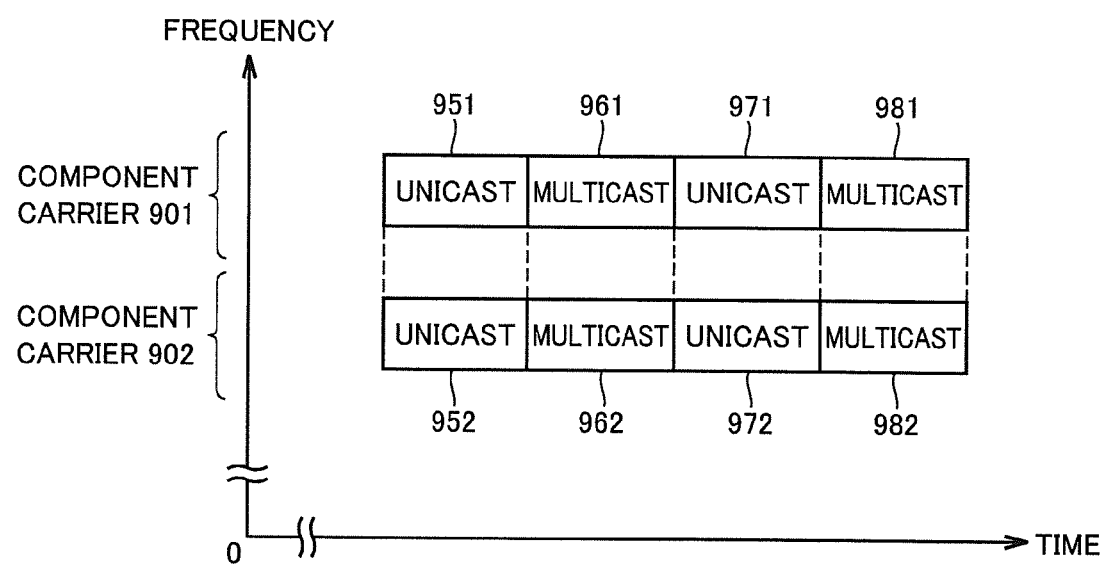
FIG. 3 is a diagram showing a transmission format of a downlink component carrier in the base station.

FIG. 3 is a diagram showing a transmission format of a downlink component carrier in base station 100. Referring to FIG. 3, in a first component carrier 901 and a second component carrier 902, unicast subframes 951, 952, 971, and 972 and multicast subframes 961, 962, 981, and 982 for MBMS are subjected to time-division multiplexing.

In unicast subframes 951, 952, 971, and 972, point-to-point connection is established for each user. In multicast subframes 961, 962, 981, and 982, multimedia service is performed through a point-to-multipoint type radio channel.

Component carrier 902 serves as a component carrier exclusively for carrier aggregation of a LTE-A terminal. Component carrier 902 does not include a synchronization signal. Component carrier 902 synchronizes with component carrier 901. Accordingly, when mobile station 300 synchronizes with component carrier 901 using the synchronization signal included in component carrier 901, it can also synchronize with component carrier 902. In other words, mobile station 300 can synchronize with base station 100 also on component carrier 902.

Base station 100 transmits indispensable information in the MBMS contents using multicast subframes 961 and 981 of component carrier 901. Furthermore, base station 100 transmits additional information corresponding to the indispensable information in the MBMS contents using multicast subframes 962 and 982 of component carrier 902. The additional information is associated with the indispensable information.

In addition, streaming server device 400 divides the information, which is to be distributed to base station 100, into indispensable information and additional information. Streaming server device 400 distributes the indispensable information and the additional information, which are divided, to base station 100. Base station 100 receives the indispensable information and the additional information, which are divided. Furthermore, base station 100 transmits the indispensable information and the additional information, which are divided, to mobile station 300.

Examples of using indispensable information and additional information may include transmission of a high-resolution image. Mobile station 300 combines an image corresponding to the indispensable information with an image corresponding to the additional information, thereby being capable of transmitting a high-resolution image from base station 100 to mobile station 300.

Another example may be relay-broadcasting of a sports game. In this case, base station 100 transmits images of the game, which are to be relayed, to mobile station 300 as indispensable information, and transmits participating player's detailed information to the mobile station as additional information. In mobile station 300, the images of the game, which are to be relayed, and the participating player's detailed information are combined, thereby being capable of presenting images containing a large quantity of information to the user.

Furthermore, even in the case of a mobile station not supporting carrier aggregation, this mobile station can receive conventional MBMS by receiving only indispensable information.

<D. Hardware Configuration of Mobile Station>

Figure 4:
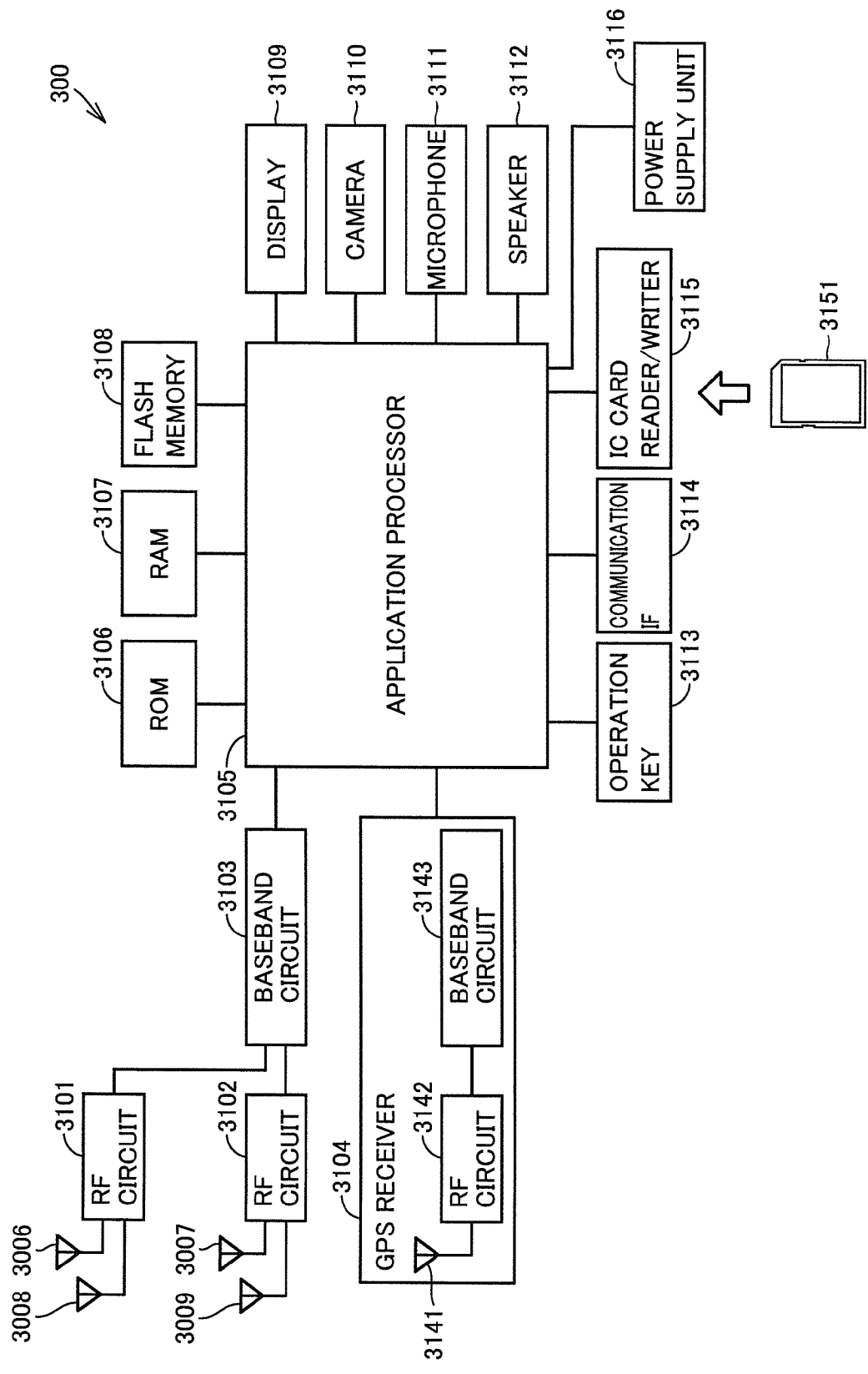
FIG. 4 is a diagram showing a typical hardware configuration of a mobile station.

FIG. 4 is a diagram showing a typical hardware configuration of mobile station 300. Referring to FIG. 4, mobile station 300 includes antennas 3006, 3007, 3008, and 3009, RF circuits 3101 and 3102, a baseband circuit 3103, a GPS receiver 3104, an application processor 3105 executing a program, a ROM (Read Only Memory) 3106, a RAM (Random Access Memory) 3107, a NAND-type flash memory 3108, a display 3109, a camera 3110, a microphone 3111, a speaker 3112, an operation key 3113 accepting an instruction input by the user, a communication IF (Interface) 3114, an IC (Integrated Circuit) card reader/writer 3115, and a power supply unit 3116.

GPS receiver 3104 includes an antenna 3141, a RF circuit 3142 and a baseband circuit 3143. GPS receiver 3104 receives a signal from a GPS satellite using antenna 3141. Furthermore, GPS receiver 3104 outputs the result of the processes in RF circuit 3142 and baseband circuit 3143 (that is, the present location information) to application processor 3105.

Antennas 3006 to 3009, RF circuits 3101 and 3102, and baseband circuit 3103 are used for radio communication among another mobile terminal, a fixed-line telephone and a PC (Personal Computer) through the base station. Specifically, antennas 3006 to 3009, RF circuits 3101 and 3102, and baseband circuit 3103 are used by mobile station 300 for establishing communication via a mobile phone network.

Flash memory 3108 is a non-volatile semiconductor memory. Flash memory 3108 stores, in a volatile manner, various types of programs for controlling mobile station 300, and various pieces of data such as data generated by mobile station 300 and data obtained from an external device of mobile station 300.

Components 3103 to 3116 are connected with one another via a data bus. IC card reader/writer 3115 is equipped with a memory card 3151.

The process in mobile station 300 is implemented by software executed by each hardware and application processor 3105. Such software may be stored in flash memory 3108 in advance. Furthermore, software may be stored in memory card 3151 or other storage media, and may be distributed as a program product. Alternatively, software may be provided as a downloadable program product by the information provider connected to the so-called Internet. Such software is read by IC card reader/writer 3115 and other readers from its storage medium, or downloaded via antennas 3006 to 3009, RF circuits 3101 and 3102 and baseband circuit 3103, or communication IF 3114, and then, temporarily stored in flash memory 3108. Its software is read by application processor 3105 from flash memory 3108, and stored in flash memory 3108 in the form of an executable program. Application processor 3105 executes this program.

Each component constituting mobile station 300 shown in the figure is commonly used. Therefore, the essential part of the present invention can be recognized as software stored in flash memory 3108, memory card 3151 and other storage media, or as software downloadable via a network. Since the operation of each hardware in mobile station 300 is well known, detailed description thereof will not be repeated.

A recording medium is not limited to a DVD-ROM, a CD-ROM, an FD (Flexible Disk), and a hard disk, but may be a medium fixedly carrying a program, such as a semiconductor memory including a magnetic tape, a cassette tape, an optical disk (MO (Magnetic Optical Disc)/MD (Mini Disc)/DVD (Digital Versatile Disc)), an optical card, a mask ROM, an EPROM (Electronically Programmable Read-Only Memory), an EEPROM (Electronically Erasable Programmable Read-Only Memory), a flash ROM, or the like. Furthermore, the recording medium is a non-transitory computer-readable medium.

The program referred herein includes not only a program directly executable by a CPU but also a program in a source program form, a compressed program, an encrypted program, and the like.

<E. Functional Configuration of Mobile Station>

Figure 5:
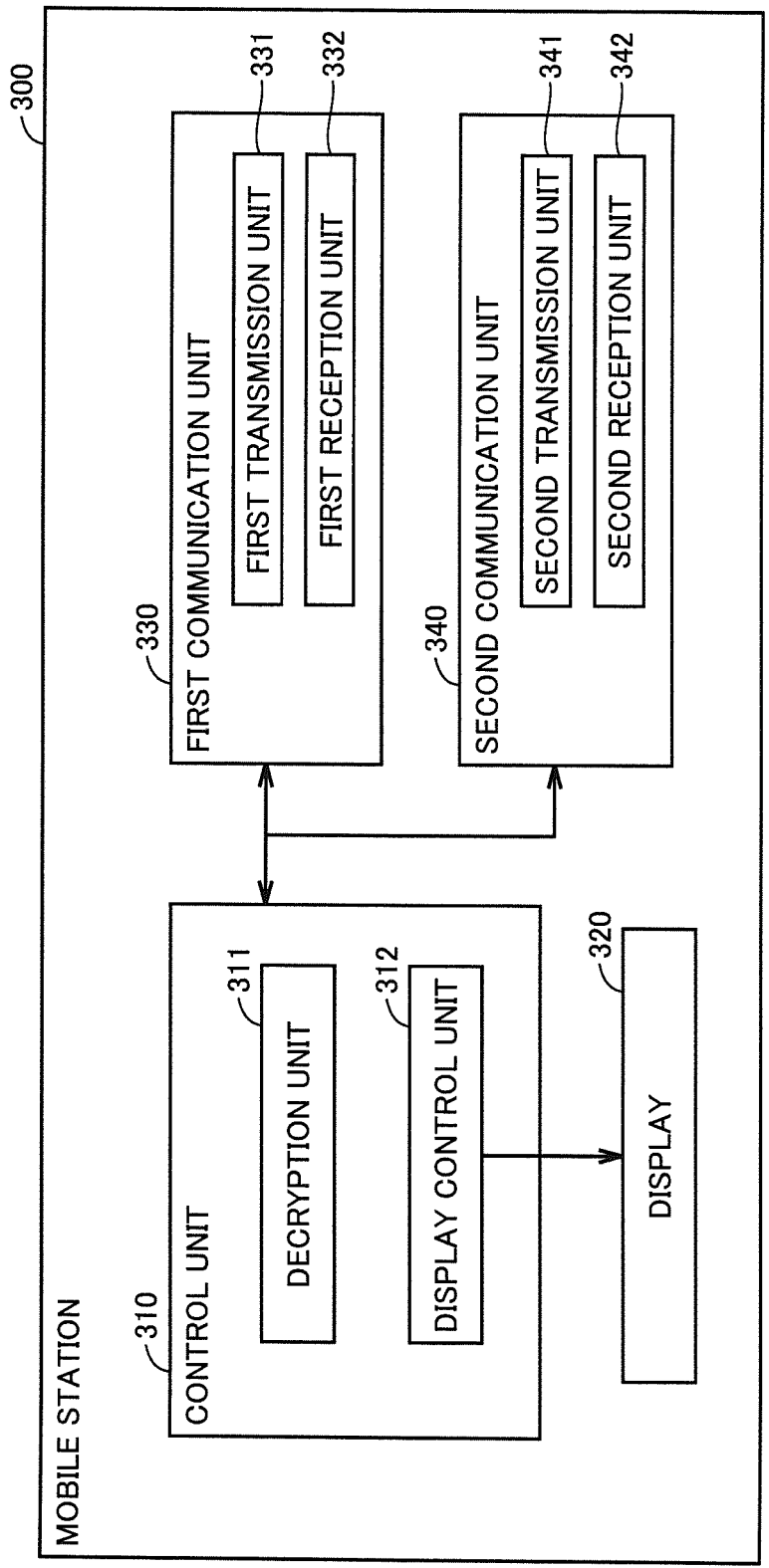
FIG. 5 is a functional block diagram for illustrating the functional configuration of the mobile station.

FIG. 5 is a functional block diagram for illustrating the functional configuration of mobile station 300. Referring to FIG. 5, mobile station 300 includes a control unit 310, a display 320, a first communication unit 330, and a second communication unit 340. Control unit 310 includes a decryption unit 311 and a display control unit 312. First communication unit 330 includes a first transmission unit 331 and a first reception unit 332. Second communication unit 340 includes a second transmission unit 341 and a second reception unit 342.

First communication unit 330 establishes communication using component carrier 901 of a plurality of component carriers 901 and 902. First transmission unit 331 transmits data using component carrier 901. First reception unit 332 receives data using component carrier 901. Details of the data transmitted to and received from base station 100 by using first communication unit 330 will be described later. It is to be noted that first communication unit 330 includes an antenna.

Second communication unit 340 establishes communication using component carrier 902 of the plurality of component carriers 901 and 902. Second transmission unit 341 transmits data using component carrier 902. Second reception unit 342 receives data using component carrier 902. Details of the data transmitted to and received from base station 100 by using second communication unit 340 will also be described later. It is to be noted that second communication unit 340 includes an antenna.

Control unit 310 controls the operation (process) of each unit of mobile station 300. Specifically, control unit 310 transmits a command based on the result of data processing to each unit. Decryption unit 311 decrypts the contents received from base station 100, which will be described later in detail. Display control unit 312 causes display 320 to display various pieces of information. Display control unit 312 causes display 320 to display the contents transmitted from the base station, for example, using indispensable information and additional information.

<F. Sequence>

FIG. 6 is a sequence chart in communication system 1. Specifically, FIG. 6 is a diagram for illustrating the control method in the case where a LTE-A terminal (mobile station 300) supporting carrier aggregation receives moving images by means of MBMS. More specifically, FIG. 6 is a diagram showing the sequence at the time when mobile station 300 receives MBMS.

Referring to FIG. 6, in step S2, mobile station 300 is started up, for example, by the user turning on a power supply switch. After start-up, mobile station 300 synchronizes with base station 100 using a synchronization signal in component carrier 901. Based on this synchronization, the location of mobile station 300 is recorded. Specifically, a device (not shown) of network 500 records the base station and the component carrier associated therewith, by which mobile station 300 is accommodated.

In step S4, base station 100 notifies mobile station 300 about indication information including MBMS information using component carrier 901. By the MBMS information transmitted using component carrier 901, mobile station 300 can detect that MBMS is being performed. Furthermore, mobile station 300 can determine based on the MBMS information whether MBMS is the information appropriate for carrier aggregation or not. When MBMS is the information appropriate for carrier aggregation, mobile station 300 can also obtain, from the MBMS information, the set information indicating a set of carrier components for which carrier aggregation is performed.

Furthermore, the MBMS information includes program information (broadcasting program information and the like) of the contents. The user is to determine based on the program information whether MBMS is received by mobile station 300 or not.

Although base station 100 notifies mobile station 300 of the MBMS information by means of indication information in the above description, base station 100 may notify mobile station 300 of the MBMS information by separate signaling different from indication information.

Although not shown in FIG. 6, streaming server device 400 distributes moving image data for multimedia service to base station 100 through network 500 as required.

In step S6, mobile station 300 is brought into a standby state on component carrier 901. In step S8, mobile station 300 accepts a request from the user to receive MBMS. When accepting the request from the user to receive MBMS, mobile station 300 requests base station 100 to transmit a decryption key for decrypting the contents in step S10. When accepting the request from mobile station 300 to transmit a decryption key, base station 100 requests streaming server device 400 to transmit a decryption key using component carrier 901 in step S12.

Based on acceptance of the request from base station 100 to transmit a decryption key, streaming server device 400 starts the process for transmitting the decryption key to base station 100 in step S14. In step S16, streaming server device 400 transmits the decryption key to base station 100. In step S18, base station 100 transmits the decryption key received from streaming server device 400 to mobile station 300 using component carrier 901.

Based on reception of the decryption key from base station 100, mobile station 300 starts receiving MBMS in step S20. In step S22, mobile station 300 receives a multicast subframe (see FIG. 3) including indispensable information of the contents from base station 100 using component carrier 901. In step S24, mobile station 300 also receives a multicast subframe including additional information associated with this indispensable information from base station 100 using component carrier 902. Although the indispensable information is transmitted earlier in timing than the additional information in FIG. 6, the timings of transmitting the indispensable information and the additional information by base station 100 are not limited thereto. Furthermore, indispensable information and additional information are encrypted by the same encryption key. In other words, the decryption key appropriate for component carrier 901 and the decryption key appropriate for component carrier 902 are the same.

In step S26, mobile station 300 decrypts the indispensable information and the additional information using the decryption key received in advance. In step S28, mobile station 300 combines the indispensable information and the additional information that have been decrypted. In step S30, mobile station 300 causes display 320 to display the image based on the information (image data) obtained by this combination.

Hereafter, reception of a multicast subframe on component carrier 901 and a multicast subframe on component carrier 902, and display of moving images based on both of these subframes are repeated in mobile station 300. Consequently, it becomes possible for mobile station 300 to receive high-resolution moving images.

The mobile station not supporting carrier aggregation (not shown) can receive MBMS, as is conventionally done, by receiving only a resource block in the multicast subframe on component carrier 901 including the above-mentioned indispensable information.

<G. Summary of Mobile Station>

(1) As described above, mobile station 300 communicates with base station 100 by carrier aggregation using a plurality of component carriers having different frequency bands. Mobile station 300 includes a reception unit receiving contents in MBMS from base station 100 (a configuration corresponding to first reception unit 332 and second reception unit 342 in FIG. 5) using at least two component carriers 901 and 902 of a plurality of component carriers; and display control unit 312 causing display 320 to display the received contents. Accordingly, mobile station 300 can apply MBMS also during carrier aggregation. In other words, mobile station 300 can utilize MBMS even during carrier aggregation.

(2) Furthermore, the contents include indispensable information and additional information associated with this indispensable information. The reception unit includes first reception unit 332 receiving indispensable information using component carrier 901 of the plurality of component carriers; and second reception unit 342 receiving additional information using component carrier 902 of the plurality of component carriers. Display control unit 312 causes display 320 to display the contents using the indispensable information and the additional information. Accordingly, it becomes possible for mobile station 300 to display detailed information based on the mutually related pieces of information received using different component carriers.

(3) Component carrier 902 synchronizes with component carrier 901. First reception unit 332 further receives a synchronization signal from base station 100 on component carrier 901. Mobile station 300 synchronizes with component carrier 901 and component carrier 902 based on the synchronization signal.

Accordingly, even if the synchronization signal is not included in component carrier 902, mobile station 300 can synchronize with component carrier 901 and component carrier 902. Therefore, mobile station 300 can receive the indispensable information and the additional information.

(4) Contents are encrypted. Mobile station 300 further includes a transmission unit transmitting a request signal requesting transmission of contents to the base station (a configuration corresponding to first transmission unit 331 and second transmission unit 341 in FIG. 5); and decryption unit 311 decrypting the contents. First reception unit 332 further receives a decryption key transmitted from base station 100 based on transmission of the request signal. Decryption unit 311 decrypts the contents using this decryption key. Accordingly, even if the contents are encrypted, mobile station 300 can decrypt the contents.

<H. Summary of Base Station>

(1) As described above, base station 100 communicates with mobile station 300 by carrier aggregation using a plurality of component carriers having different frequency bands. Base station 100 receives a request from mobile station 300 to receive the contents in the multimedia broadcast/multicast service. Furthermore, base station 100 transmits the contents to mobile station 300 using at least two component carriers 901 and 902 of the plurality of component carriers. Accordingly, base station 100 can apply MBMS also during carrier aggregation. In other words, base station 100 allows mobile station 300 to utilize MBMS even during carrier aggregation.

(2) Contents include indispensable information and additional information associated with the indispensable information. Base station 100 transmits the indispensable information using component carrier 901 of a plurality of component carriers. Furthermore, base station 100 transmits the additional information using component carrier 902 of the plurality of component carriers.

Accordingly, even when carrier aggregation is performed by means of MBMS, base station 100 can ensure the compatibility with the mobile station that is not appropriate for carrier aggregation. In other words, according to base station 100, even if the mobile station appropriate for carrier aggregation (for example, mobile station 300) and the mobile station not appropriate for carrier aggregation are located under coverage, the mobile station not appropriate for carrier aggregation receives only the indispensable information using component carrier 901, thereby allowing the image of MBMS to be displayed also on this mobile station not appropriate for carrier aggregation.

<I. Modification>

(1) Description has been made in the above by way of example with regard to mobile station 300 having a configuration in which a decryption key is received from base station 100 only once before starting reception of MBMS, but not limited thereto. For example, streaming server device 400 may be configured so as to periodically change the decryption key. In this case, mobile station 300 only has to be configured so as to periodically receive the decryption key from streaming server device 400 through base station 100.

(2) The decryption key appropriate for component carrier 901 and the decryption key appropriate for component carrier 902 are assumed to be the same in the above description, but not limited thereto. The decryption key appropriate for component carrier 901 (which will be hereinafter also referred to as a "first decryption key") and the decryption key appropriate for component carrier 902 (which will be hereinafter also referred to as a "second decryption key") may be separately set.

In this case, first reception unit 332 (see FIG. 5) receives the first decryption key using component carrier 901. Second reception unit 342 receives the second decryption key using component carrier 902. Decryption unit 311 decrypts the indispensable information using the first decryption key, and decrypts the additional information using the second decryption key.

(3) Description has been made in the above by way of example with regard to the configuration in which streaming server device 400 transmits the indispensable information and the additional information, which are encrypted, of the contents to mobile station 300 through base station 100, but not limited thereto. Streaming server device 400 may transmit the indispensable information and the additional information, which are not encrypted, to mobile station 300 through base station 100. Alternatively, streaming server device 400 may transmit only encrypted one of the indispensable information and the additional information to mobile station 300 through base station 100.

(4) Furthermore, description has been made in the above by way of example with regard to the configuration in which base station 100 transmits additional information to mobile station 300 using one component carrier 902, but not limited thereto. When there are three or more component carriers that can be used, base station 100 and mobile station 300 may transmit and receive the additional information using two or more component carriers (including component carrier 902) of these three or more component carriers other than component carrier 901.

In other words, base station 100 may transmit the additional information to mobile station 300 using component carrier 902 and at least one component carrier of the plurality of component carriers other than component carrier 901 and component carrier 902. On the other hand, mobile station 300 may receive the additional information from base station 100 using component carrier 902 and the above-mentioned at least one component carrier of the plurality of component carriers other than component carrier 901 and component carrier 902.

(5) Description has been made in the above with regard to the configuration in which the data for multimedia service is divided into indispensable information and additional information which are then transmitted from component carriers 901 and 901. However, when the compatibility with the mobile station not supporting carrier aggregation is not required, it is not necessary to divide the data for multimedia service into indispensable information and additional information for transmission.

[Second Embodiment]

Description has been made in the first embodiment with regard to the case where component carrier 902 serves as a component carrier not including a synchronization signal and used exclusively for carrier aggregation of a LTE-A terminal. In the present embodiment, description will be made with regard to the case where component carrier 902 serves as a component carrier that includes a synchronization signal and can be received by an LTE terminal, like component carrier 901.

FIG. 7 is a sequence chart in communication system 1. Specifically, FIG. 7 is a diagram for illustrating a control method in the case where an LTE-A terminal (mobile station 300) supporting carrier aggregation receives moving images by means of MBMS. More specifically, FIG. 7 is a diagram illustrating the sequence at the time when mobile station 300 receives MBMS.

In the following, as in the first embodiment, mobile station 300 is assumed to receive indispensable information using component carrier 901, and receive additional information using component carrier 902. Also, the component carrier for transmitting indispensable information will be also referred to as a "main component carrier" while the component carrier for transmitting additional information will be also referred to as a "sub-component carrier".

Referring to FIG. 7, in step S102, mobile station 300 is started up, for example, by the user turning on a power supply switch. After start-up, mobile station 300 tries to achieve synchronization with base station 100 using a synchronization signal on component carrier 901 or synchronization with base station 100 using a synchronization signal on component carrier 902.

Since component carrier 901 and component carrier 902 each include a synchronization signal, the location of mobile station 300 can be recorded in either of these component carriers. Description will be made in the following with regard to the case where the location of mobile station 300 is recorded in component carrier 902. That is, in the following description, in devices (not shown) of network 500, mobile station 300 is located under coverage of component carrier 902 of base station 100.

In step S104, base station 100 notifies mobile station 300 of indication information including MBMS information using component carrier 902. Furthermore, in step S106, base station 100 notifies mobile station 300 of indication information including MBMS information using component carrier 901. It is to be noted that mobile station 300 receives indication information in the process of recording the location.

In the present embodiment, by the MBMS information transmitted using component carrier 902, mobile station 300 detects that MBMS is being performed. Furthermore, the MBMS information includes the information indicating a main component carrier and a sub-component carrier. By receiving the MBMS information, mobile station 300 recognizes that the main component carrier is component carrier 901.

If the location of mobile station 300 is recorded in component carrier 901 instead of component carrier 902, mobile station 300 is to obtain MBMS information by the indication information notified by component carrier 901.

Although base station 100 notifies mobile station 300 of the MBMS information by the indication information in the above description, it may notify mobile station 300 of the MBMS information by separate signaling different from the indication information.

Furthermore, as described also in the first embodiment, mobile station 300 can determine based on the MBMS information whether MBMS is the information appropriate for carrier aggregation or not. Furthermore, the MBMS information includes program information (broadcasting program information and the like) of the contents. The user is to determine based on the program information whether MBMS is received by mobile station 300 or not.

Although not shown in FIG. 7, streaming server device 400 distributes moving image data for multimedia service to base station 100 through network 500 as required.

In step S108, mobile station 300 is brought into a standby state on component carrier 902. In step S110, mobile station 300 accepts a request from the user to receive MBMS. When accepting the request to receive MBMS, mobile station 300 synchronizes with base station 100 using a synchronization signal on component carrier 901 that is a main component carrier. Then, in step S112, mobile station 300 starts receiving data using component carrier 901. This synchronization causes mobile station 300 to synchronize with each of component carrier 901 and component carrier 902.

In step S114, mobile station 300 requests base station 100 to transmit the decryption key for decrypting the contents using the main component carrier (that is, component carrier 901). It is to be noted that mobile station 300 may be in a standby state on component carrier 901 in and after step S112.

When accepting the request from mobile station 300 to transmit the decryption key, base station 100 requests streaming server device 400 to transmit the decryption key in step S116.

Based on acceptance of the request from base station 100 to transmit the decryption key, streaming server device 400 starts the process for transmitting the decryption key to base station 100 in step S118. In step S120, streaming server device 400 transmits the decryption key to base station 100. In step S122, base station 100 transmits the decryption key received from streaming server device 400 to mobile station 300 using component carrier 901.

Based on reception of the decryption key from base station 100, mobile station 300 starts receiving MBMS in step S124. In step S126, mobile station 300 receives a multicast subframe including indispensable information of the contents from base station 100 using component carrier 901. Furthermore, in step S128, mobile station 300 receives a multicast subframe including additional information associated with the above-mentioned indispensable information from base station 100 using component carrier 902. Although the indispensable information is transmitted earlier in timing than the additional information in FIG. 7, the timings of transmitting the indispensable information and the additional information by base station 100 are not limited thereto. Furthermore, indispensable information and additional information are encrypted by the same encryption key. In other words, the decryption key appropriate for component carrier 901 and the decryption key appropriate for component carrier 902 are the same.

In step S130, mobile station 300 decrypts the indispensable information and the additional information using the decryption key received in advance. In step S132, mobile station 300 combines the indispensable information and the additional information that have been decrypted. In step S134, mobile station 300 causes display 320 to display the image based on the information (image data) obtained by the combination.

Hereafter, reception of a multicast subframe on component carrier 901 and a multicast subframe on component carrier 902, and display of moving images based on both of these subframes are repeated in mobile station 300. Consequently, it becomes possible for mobile station 300 to receive high-resolution moving images.

While the operation of mobile station 300 serving as a LTE-A terminal has been described in the above, the MBMS information is notified by indication information on component carrier 901 and component carrier 902. Accordingly, the LTE terminal can also receive only the indispensable information almost in the same operation. For example, in the case where the LTE terminal is in a standby state on component carrier 902, the LTE terminal can determine that the main component carrier is component carrier 901 when obtaining the MBMS information. Accordingly, the LTE terminal is to receive MBMS after switching the component carrier to be received into component carrier 901.

Also in the present embodiment, various types of modifications described in "(1) to (5) in <1. Modification>" in the first embodiment can be applied.

As described above, in the present embodiment, first reception unit 332 further receives a synchronization signal from base station 100 (which will be hereinafter referred to as a "first synchronization signal") on component carrier 901. Second reception unit 342 further receives a synchronization signal from base station 100 (which will be hereinafter referred to as a "second synchronization signal") on component carrier 902. Mobile station 300 synchronizes with component carrier 901 based on the first synchronization signal, and synchronizes with component carrier 902 based on the second synchronization signal. Accordingly, mobile station 300 can synchronize with base station 100 for two component carriers.

[Third Embodiment]

Description has been made in the first embodiment with regard to the case where one MBMS is used. In the present embodiment, description will be made with regard to the case where there are a plurality of MBMSs (that is, a plurality of MBMS channels). Some other system configuration and component carrier configuration are the same as those in the first embodiment.

FIG. 8 is a sequence chart in communication system 1. Specifically, FIG. 8 is a diagram for illustrating the control method in the case where a LTE-A terminal (mobile station 300) supporting carrier aggregation receives moving images by means of MBMS, as in FIG. 6. More specifically, FIG. 8 is a diagram showing the sequence at the time when mobile station 300 receives MBMS. Differences in FIG. 8 from FIG. 6 will be hereinafter described.

In the process of recording the location in component carrier 901, mobile station 300 receives, from base station 100, MBMS service channel information notified by the indication information on component carrier 901 and MBMS information including the information on the main component carrier and the sub-component carrier in the service channel. When mobile station 300 receives the above-mentioned service channel information and the above-mentioned MBMS information that are included in the indication information, the user of mobile station 300 can recognize what kind of MBMS service is being performed.

Although base station 100 notifies mobile station 300 of the MBMS information by the indication information in the above description, it may notify mobile station 300 of the MBMS information by means of separate signaling different from the indication information.

After receiving the MBMS information, mobile station 300 comes into a standby state on component carrier 901 in step S6. When mobile station 300 accepts a request from the user to receive MBMS in step S8, mobile station 300 accepts the user operation for selecting service information that the user wants to receive from among the MBMS service information that has been already obtained, in step S40.

In step S10, mobile station 300 transmits, to base station 100, a request signal requesting transmission of a decryption key for service information selected by the user. In this case, base station 100 transmits the request signal to streaming server device 400. Subsequent processes are the same as those in the first embodiment.

A specific explanation about the request to transmit the contents will be given as below. First reception unit 332 of mobile station 300 receives, from base station 100, a plurality of pieces of identification information for identifying the contents in a plurality of MBMSs. It is to be noted that this identification information is included in the indication information. Based on acceptance of a command to select any one of the plurality of pieces of identification information, mobile station 300 requests base station 100 to transmit the contents corresponding to the selected identification information.

As described in the second embodiment, in the case where component carrier 902 serves as a component carrier that includes a synchronization signal and can be received also by a LTE terminal like component carrier 901, base station 100 only has to perform the following process. Specifically, in step S4 where mobile station 300 is notified of MBMS information, base station 100 only has to notify mobile station 300 of the information about the main component carrier and the information about the sub-component carrier collectively for each service. Base station 100 of course gives similar notification about component carrier 902. In such an example, depending on the service channel, component carrier 901 may be a main component carrier, or component carrier 902 may be a main component carrier.

Also in the present embodiment, various types of modifications described in "(1) to (5) in <I. Modification>" in the first embodiment can be applied.

As described above, in the present embodiment, first reception unit 332 further receives a plurality of pieces of identification information for identifying the contents in a plurality of MBMSs. Based on acceptance of a command to select any one of the plurality of pieces of identification information, mobile station 300 requests base station 100 to transmit the contents corresponding to the selected identification information. Accordingly, even when there are a plurality of MBMSs (that is, a plurality of MBMS channels), mobile station 300 can receive MBMS in accordance with the user's instruction.

The embodiments disclosed herein are merely by way of example, but not limited only to the above-described description. The scope of the present invention is defined by the terms of the claims, and is intended to include any modifications within the scope and meaning equivalent to the terms of the claims.

REFERENCE SIGNS LIST 1 communication system, 100, 100a base station, 300 mobile station, 310 control unit, 311 decryption unit, 312 display control unit, 320, 3109 display, 330 first communication unit, 331 first transmission unit, 332 first reception unit, 340 second communication unit, 341 second transmission unit, 342 second reception unit, 400 streaming server device, 500 network, 901, 902 component carrier, 910, 910a, 920, 920a cell, 951, 952, 961, 962, 971, 972, 981, 982 subframe, 1100, 1200, 3006, 3007, 3008, 3009, 3141 antenna, 1300 radio processing unit, 1301, 1302 duplexer, 1303, 1304 power amplifier, 1305, 1306 low-noise amplifier, 1307, 1308 transmission circuit, 1309, 1310 reception circuit, 1311 quadrature modulation/demodulation unit, 1400 baseband unit, 1410, 3103, 3143 baseband circuit, 1420 control device, 1421 CPU, 1422 ROM, 1423 RAM, 1424 non-volatile memory, 1430 timing control unit, 1440 communication interface, 1450 power supply unit, 3101, 3102, 3142 circuit, 3105 application processor, 3108 flash memory, 3113 operation key, 3115 card reader/writer, 3116 power supply unit, 3151 memory card, 3114 communication IF.

The invention claimed is:

1. A mobile station communicating with a base station by carrier aggregation using a plurality of component carriers having different frequency bands, said mobile station comprising:
a reception circuit receiving contents in a multimedia broadcast/multicast service from said base station using at least two component carriers of said plurality of component carriers; and
a display circuit causing a display to display said contents received,
said contents include first information and second information associated with said first information,
said reception circuit includes
a first reception circuit receiving said first information using a first component carrier of said plurality of component carriers, and
a second reception circuit receiving said second information using a second component carrier of said plurality of component carriers, and
said display control circuit causes the display to display said contents using said first information and said second information, wherein
said first reception circuit further receives a first synchronization signal from said base station on said first component carrier,
said second reception circuit further receives a second synchronization signal from said base station on said second component carrier, and
said mobile station synchronizes with said first component carrier based on said first synchronization signal, and synchronizes with said second component carrier based on said second synchronization signal.

2. The mobile station according to claim 1, wherein
said contents are encrypted,
said mobile station further includes
a transmission circuit transmitting a request signal requesting transmission of said contents to said base station, and
a decryption circuit decrypting said contents,
said first reception circuit further receives a decryption key transmitted from said base station based on transmission of said request signal, and
said decryption circuit decrypts said contents using said decryption key.

3. The mobile station according to claim 2, wherein
said decryption key includes a first decryption key for decrypting said first information, and a second decryption key for decrypting said second information,
said first reception circuit receives said first decryption key using said first component carrier,
said second reception circuit receives said second decryption key using said second component carrier, and
said decryption circuit decrypts said first information using said first decryption key, and decrypts said second information using said second decryption key.

4. The mobile station according to claim 1, wherein said second reception unit circuit receives said second information using said second component carrier and at least one component carrier of said plurality of component carriers other than said first component carrier and said second component carrier.

5. A communication system comprising:
a first mobile station conforming to carrier aggregation;
a second mobile station not conforming to said carrier aggregation; and
a base station capable of communicating with said first mobile station and said second mobile station,
said base station including a communication circuit for transmitting contents in a multimedia broadcast/multicast service to said first mobile station and said second mobile station,
said communication circuit
communicating with said first mobile station by a first component carrier and a second component carrier used for said carrier aggregation, and
communicating with said second mobile station only by said first component carrier of said first component carrier and said second component carrier,
said contents including first information and second information associated with said first information,
said communication circuit
transmitting said first information to said first mobile station and said second mobile station by said first component carrier, and
transmitting said second information to said first mobile station by said second component carrier, and
said first mobile station
receiving said first information and said second information, and
causing a display to display an image based on said received first information and said received second information,
said second mobile station
receiving said first information, and
causing a display to display an image based on said received first information.

6. A base station capable of communicating with a first mobile station conforming to carrier aggregation and a second mobile station not conforming to said carrier aggregation, said base station comprising:
a communication circuit for transmitting contents in a multimedia broadcast/multicast service to said first mobile station and said second mobile station,
said communication circuit
transmitting a first information to said first mobile station and a second mobile station by a first component carrier, and
transmitting a second information to said first mobile station by a second component carrier, wherein said communication circuit transmits, to said first mobile station and said second mobile station, information for determining whether said multimedia broadcast/multicast service is appropriate or not for said carrier aggregation.

7. The base station according to claim 6, wherein said communication circuit transmits, using said first component carrier and said second component carrier, said information for determining whether said multimedia broadcast/multicast service is appropriate or not for said carrier aggregation.

* * * * *